United States Patent [19]

Boyle

[11] Patent Number: 4,872,970
[45] Date of Patent: Oct. 10, 1989

[54] REACTIVATION OF IRIDIUM-CONTAINING CATALYSTS

[75] Inventor: Joseph P. Boyle, Sarnia, Canada

[73] Assignee: Exxon Research and Engineering Company, Florham Park, N.J.

[21] Appl. No.: 248,512

[22] Filed: Sep. 23, 1988

[51] Int. Cl.$^4$ .................. C10G 35/09; C10G 35/085; B01J 23/96; B01J 38/44
[52] U.S. Cl. ...................................... 208/140; 502/37
[58] Field of Search ........................... 208/140; 502/37

[56] References Cited

U.S. PATENT DOCUMENTS

| | | | |
|---|---|---|---|
| 4,444,895 | 4/1984 | Fung et al. | 502/37 |
| 4,444,896 | 4/1984 | Fung et al. | 502/37 |
| 4,480,046 | 10/1984 | Fung et al. | 208/140 |
| 4,514,284 | 4/1985 | Wairegi et al. | 208/140 |
| 4,517,076 | 5/1985 | Boyle et al. | 208/140 |
| 4,738,939 | 4/1988 | Boyle | 502/37 |

Primary Examiner—Paul E. Konopka
Attorney, Agent, or Firm—John W. Ditsler

[57] ABSTRACT

Supported iridium-containing hydrocarbon conversion catalyst that are at least partially deactivated due to the deposition of carbonaceous residues thereon during contact with hydrocarbons are reactivated by (1) contacting the catalyst with a gas containing oxygen and a chlorinated compound at a temperature not exceeding about 425° C. to burn a major portion of the carbonaceous residues from the catalyst, (2) contacting the partially carbonaceous residue depleted catalyst with a gas containing a chlorinated compound a temperature of at least about 460° C. to increase the chloride content thereof, (3) contacting the chlorinated catalyst with a gas containing oxygen and a chlorinated compound at a temperature of at least about 460° C. to burn a major portion of the remaining carbonaceous residue from the catalyst, (4) contacting the substantially carbonaceous residue depleted catalyst with a gas containing a chlorinated compound and oxygen at concentrations greater than those used in (3) and at a temperature of at least about 460° C. under essentially stagnant conditions for at least 1 hour, and (5) repeating step (4) at least two additional times to redisperse the agglomerated iridium to a highly active, high surface area state.

32 Claims, No Drawings

REACTIVATION OF IRIDIUM-CONTAINING CATALYSTS

BACKGROUND OF THE INVENTION

1. Field of the Invention

This invention relates to a method for reactivating an iridium-containing catalyst that has been at least partially deactivated by the deposit of carbonaceous residues thereon and by the agglomeration of the iridium.

2. Discussion of Related Art

For many years, the petroleum industry has used reforming, or hydroforming, processes for upgrading virgin or cracked naphthas to produce high octane products. In reforming, a dual-functional catalyst (i.e., a catalyst having an acid function and a hydrogenation-dehydrogenation function) is employed. A metal component, or components, is substantially atomically dispersed upon the surface of a porous, inorganic oxide support (notably alumina) to provide the necessary hydrogenation-dehydrogenation function. Platinum catalysts, particularly metal promoted platinum catalysts, are currently employed. Reforming is defined as the total effect of the molecular changes, or hydrocarbon reactions, produced by (1) dehydrogenation of cyclohexanes and dehydroisomerization of alkylcyclopentanes to yield aromatics, (2) dehydrogenation of paraffins to yield olefins, (3) dehydrocyclization of paraffins and olefins to yield aromatics, (4) isomerization of n-paraffins, (5) isomerization of alkylcycloparaffins to yieldcyclohexanes, (6) isomerization of substituted aromatics, and (7) hydrocracking of paraffins to produce gas and coke, the latter being deposited on the catalyst.

The activity of the catalyst gradually declines in reforming due to the build-up of carbonaceous deposits, or coke, on the catalyst which physically blocks the catalytically active metal and acidic sites. During operation, the temperature of the process is gradually raised to compensate for the activity loss. Eventually, however, economics requires reactivating the catalyst. Consequently, in all processes of this type, the catalyst must be periodically regenerated by burning-off the coke at controlled conditions.

In the regeneration of unpromoted platinum catalysts, reactivating the catalyst has required catalyst regeneration, or burning of the coke from the catalyst, followed by redispersing the agglomerated metal by halogen treatment. For example, coke can be readily burned from a coked platinum catalyst by contact with an atmosphere of oxygen, or oxygen and chlorine gas, at flame front temperatures of about 540° C., and oxygen concentrations up to about 6 volume percent. The agglomerated metal can then be readily redispersed to return the catalyst activity to essentially that of a fresh catalyst. Thus, the agglomerated platinum metal is redispersed to a fine state of dispersion, with relative ease, by treatment with chloride or other halogen-containing reagent, generally used in admixture with oxygen at elevated temperatures to increase the rate of redispersion.

However, this approach is not suitable for iridium containing, or iridium promoted, platinum catalysts. At such conditions the iridium component is severely agglomerated and the catalyst easily damaged. Iridium agglomeration reduces the metal surface area of the catalyst, thereby reducing catalyst activity and activity maintenance (i.e., cycle length). By iridium agglomeration is meant the percentage of total iridium atoms on the catalyst that is in clusters of 50 Å, or greater, as measured by x-ray diffraction. Once agglomerated, iridium is very difficult to redisperse, and the agglomerated iridium causes carbon or coke to be retained on the catalyst. Increasing the chloride level of an iridium-containing catalyst has been found to suppress agglomeration of the iridium, but the chloride combines with the more reactive carbon to form a flameproof species of coke. Hence, the reactivation of iridium-containing catalysts presents a more complex problem than presented by the earlier non-iridium promoted platinum catalysts.

Techniques useful for the redispersion of platinum are not directly applicable for the redispersion of iridium, or iridium in admixture with other metal hydrogenation-dehydrogenation components. Unlike platinum, large iridium and iridium oxide crystallites are formed under the conditions at which coke is readily removed and the platinum redispersed. Once formed, the iridium and iridium oxide crystallites are not readily redispersed to their original high surface area state by a simple halogen treatment immediately following the burning operation. Recently, faced with an acute need, techniques have been developed by virtue of which iridium, or iridium in admixture with other metal hydrogenation-dehydrogenation components, can be redispersed to a high surface area state. Patents exemplifying the state-of-the-art of regenerating and redispersing the iridium component of iridium-containing catalysts are U.S. Pat. Nos. 3,904,510; 3,937,660; 3,939,061; 3,939,062; 3,941,682; 3,941,716; 3,943,052; 3,981,823; 3,998,755; 4,018,670; 4,046,673; 4,148,749; 4,172,817; 4,277,369; 4,359,400; 4,444,895; 4,444,896; 4,444,897; 4,447,551; 4,467,045; 4,472,514; 4,472,515; 4,473,656; 4,480,046; 4,514,284; and 4,517,076. Foreign patents of interest are GB 2,091,577A; DDR 150,986; DDR 149,846; DDR 151,556; and European patent application No. 00936321. U.S. Pat. Nos. 4,444,895; 4,444,896; and 4,480,046 (the disclosures of which are incorporated herein by reference) are of particular interest because each involves the redispersion of iridium using a gas at a low flow rate.

However, all of these references reactivate iridium-containing catalysts under flow conditions. None teach or suggest the non-flow reactivation procedure described hereinafter.

SUMMARY OF THE INVENTION

This invention relates to a new method for reactivating iridium-containing catalysts that have become deactivated due to the deposit of coke thereon and agglomeration of the iridium promoter. More specifically, coked iridium-containing catalysts can be reactivated by the steps comprising (1) contacting the catalyst with an oxygen-containing dry gas at a temperature which does not exceed 425° C. to remove (or burn) a major portion of the coke from the catalyst, wherein the gas also contains a chlorinated compound to suppress iridium agglomeration during this step, (2) contacting the coke-depleted catalyst with a dry gas containing a chlorinated compound to increase the chloride content of the catalyst to a level sufficient to suppress iridium agglomeration at temperatures of at least about 460° C., (3) contacting the chlorinated catalyst with a gas containing oxygen and a chlorinated compound at a temperature of at least about 460° C. for a period of time sufficient to remove a major portion of the remaining coke from the catalyst, (4) contacting the substantially coke-depleted catalyst from (3) with a gas containing oxygen and a chlorinated compound at at temperature of at least 460° C., the concentrations of the oxygen and chlorinated compound in the gas being greater than the concentrations used in (3), wherein the contacting occurs under essentially stagnant gas conditions for form about 1 to about 6 hours, and (5) repeating step (4) at least two additional times to substantially redisperse the agglomerated iridium.

Preferably, the catalyst may then be contacted with a stripping gas to remove excessive chloride. Hydrogen chloride is a preferred chlorinated compound.

Although this invention is effective in reactivating an iridium-containing catalyst within a wide variety of reactivation conditions, it is particularly applicable and effective in a conventional gas flow reactivation procedure when the gas is in turbulent flow (i.e., when the particle Reynolds Number is at least 200).

DETAILED DESCRIPTION OF THE INVENTION

The first step in the present invention is to subject the coked, iridium agglomerated catalyst to a low temperature primary burn. However, before initiating this burn, the chloride content of the catalyst should be at least about 0.9 wt% (based on the dry weight of the catalyst) to protect (or passivate) the iridium against agglomeration or a significant increase in the level of agglomeration during the low temperature burn if the catalyst is already partially agglomerated. However, if the catalyst chloride level is less than about 0.9 wt%, the level can be increased by contacting the catalyst with a dry non-reactive or inert gas containing a chlorinated compound. Suitable chlorinated compounds include carbon tetrachloride; 1,1-dichloroethane; 1,2-dichloroethane; cis-dichloroethylene; trans-dichloroethylene; ethyl chloride; hexachloroethane, hydrogen chloride; methyl chloroform; pentachloroethane; perchloroethylene; 1,1,1,2-tetrachloroethane; 1,1,1,2-tetrachloroethane; 1,1,2,2-tetrachloroethane; 1,1,2-trichloroethane; trichloroethylene, vinyl chloride; vinylidene chloride, or mixtures thereof. Preferred chlorinated compounds are carbon tetrachloride, hydrogen chloride, trichloroethylene, or mixtures thereof, with hydrogen chloride being particularly preferred. The gas should be as dry as possible and should contain no more than about 50 parts of water (preferably no more that about 10 parts of water) per million parts by volume (vppm) of gas. The catalyst should be contacted with this gas for a period of time sufficient to increase the chloride content of the catalyst to at least about 0.9 wt%, preferably from about 0.9 to about 1.5 wt%, and more preferably from about 1.0 to about 1.2 wt%, based on dry catalyst.

Once the catalyst has been chlorinated as described above, the low temperature (or primary) burn is initiated by contacting the catalyst bed with a gas containing oxygen and one of the above mentioned chlorinated compounds in which the chlorinated compound is present in an amount sufficient to maintain the necessary protective level of chloride on the catalyst to prevent iridium agglomeration (or increased iridium agglomeration) during this burn (i.e., maintain a chloride level on the catalyst of at least 0.9 wt.%, preferably from about 0.9 to about 1.5 wt.%, and more preferably from about 1.0 to about 1.2 wt.%). The amount of oxygen in the gas should be sufficient to provide the desired flame front temperature to burn-off (or remove) the coke. In general, the gas will contain from about 10 to about 100 vppm (preferably from about 30 to about 50 vppm) of the chlorinated compound and up to about 5000 vppm (preferably from about 1000 to about 5000 vppm, more preferably from about 2000 to about 4000 vppm) of oxygen. This amount of oxygen is adequate to maintain a flame front temperature not exceeding about 425° C. Preferably, the flame front temperature should range from about 375° C. to about 425° C., more preferably from about 400° C. to about 425° C. The primary burn is performed for a period of time sufficient for the flame front to pass through the bed and burn a major portion of coke from the catalyst without agglomeration, or significant increase in agglomeration, of the iridium. Generally, from about 60 to about 90%, preferably from about 70 to about 90%, of the coke, based on the weight of the catalyst (dry basis), is removed from the catalyst.

Before initiating the secondary (or higher temperature) burn step, the catalyst must undergo further chlorination to protect the iridium component against agglomeration, or increase in the level of agglomeration, during this burn. The catalyst is chlorinated by contact with a dry gas containing one of the chlorinated compounds mentioned above, the contacting occurring at a temperature of at least about 460° C., preferably at a temperature between about 460° and about 530° C., and more preferably at a temperature between about 480;20 and about 510° C. The gas should be as dry as possible and should not contain greater than about 50 vppm, preferably not greater than about 10 vppm, of water. In general, the gas will contain up to about 5000 vppm, preferably from about 100 to about 5000 vppm and more preferably from about 400 to about 3000 vppm, of the chlorinated compound. The catalyst is contacted with the gas for a period of time sufficient to increase the chloride level of the catalyst to at least about 1.6 wt.%, based on dry catalyst. At chloride concentrations below this level, secondary burn conditions will produce agglomeration of the iridium. Preferably the chloride concentration will range between about 1.6 and about 2.5 wt%, based on the total weight of the dry catalyst. Larger concentrations of chloride on the catalyst are not necessary to adequately protect it during the high temperature secondary burn. There is a trade off between the time required for adequate chlorination of the catalyst and the concentration of the chlorinated compound used for chloriding the catalyst. A larger concentration of chlorinated compound in the gas will require less contact time to adequately chlorinate the catalyst while, conversely, a lower chlorinated compound concentration in the gas will require greater contact time. For example, at a gas flow rate of 27 SCF/hr/lb of catalyst, a gas containing 1600 vppm of hydrogen chloride will require about 2 hours for chlorination, while a gas containing about 100 vppm of hydrogen chloride will require about 40 hours to perform the same degree of chlorination. In chloriding the catalyst, it is generally adequate to use a gas containing the same or about the same concentration of chlorinated compound as employed in chloriding the catalyst for the low temperature primary burn. However, to offset the additional time required to complete chlorination of the catalyst, the concentration of chlorinated compound can be proportionately increased, taking into account the amount of chloride to be deposited on the catalyst and time required to complete the chlorination.

Once the catalyst has been chlorided, it is subject to a high temperature secondary burn that removes a major portion (preferably substantially all) of the residual coke remaining fromt he low temperature primary burn without agglomeration (or increased agglomeration) of the iridium component. In general, from about 60 to about 95 wt.%, preferably from about 70 to about 95 wt.%, of the residual (or remaining) coke is removed from the catalyst such that the catalyst will be substantially coke-depleted following the secondary burn. In conducting the secondary burn, the concentration of the chlorinated compound and oxygen in the gas added (or injected) during the secondary burn are increased relative to the concentrations employed during the low temperature primary burn. A chloride level ranging from about 100 to about 5000 vppm, preferably from about 150 to about 3000 vppm, is effective in suppressing agglomeration of the iridium component during the secondary burn. The gas must also containing oxygen, generally up to about 5000 vppm (preferably from about 100 to about 5000 vppm and more preferably from about 2000 to about 4000 vppm) of oxygen to provide a flame front temperature of at least about 460° C., preferably from about 460° to a maximum of about 530° C., and more preferably from about 480° C. to about 510° C.

After completion of the secondary burn, the agglomerated iridium is then redispersed. In prior art processes, iridium redispersion is effected under flow conditions. However, the non-flkow technique described below has proven to be very effective, particularly in turbulent flow systems wherein the particle Reynolds Number is at least 200 (preferably at least about 250), the particle Reynolds Number being defined as $$Re_p = \frac{\rho\, U\, d_p}{\mu}$$

where $\rho$ = gas density in lb/ft$^3$.
U = actual gas velocity in ft/sec.
$d_p$ = equivalent diameter of a catalyst particle in ft.
$\mu$ = absolute viscosity of the gas in lb/ft.sec.

Following the secondary burn, the chloride level in the gas is raised to from between about 300 to about 10,000 vppm (preferably from between about 500 to about 5000 vppm). The oxygen level in the gas is increased to from between about 0.3 to about 5 volume %, preferably from between about 0.3 to about 3 volume %, (step-wise or linearly, preferably the latter) over a period of form about 30 minutes to about 1 hour or more. The temperature and pressure used in this step are within the same range as those conditions used in the secondary burn. Once the atmosphere throughout the catalyst bed is substantially uniform (i.e., the oxygen and chloride composition of the gas at the bed outlet has stabilized at a particular level or is essentially the same for a reasonable period of time), the bed is isolated fromthe catalyst regeneration circuit so that flow of gas into and out of the catalyst bed ceases. This may be done, for example, by blocking-off the gas inlet and outlet to the reactor or vessel containing the catalyst bed. The gas is then allowed to remain in contact with the catalyst bed under essentially stagnant conditions (i.e., without a replenishment of the gas contacting the bed) for at least about 1 hour, preferably for from about 1 to about 6 hours, more preferably from about 2 to about 4 hours, or until the temperature in the catalyst bed becomes less than about 460° C. After the catalyst has "soaked" in the gas for an appropriate period of time, the reactor or vessel is "opened" to the regeneration circuit and flow of gas re-established throughout the catalyst bed. Once the atmosphere through the bed is substantially uniform, the bed is again isolated from the regeneration circuit and allowed to "soak" in the gas under essentially stagnant conditions as before. This "soaking" procedure should be repeated until the iridium component is redispersed. The number of times the catalyst must be "soaked" to redisperse the iridium component will depend upon the extent of iridium agglomeration as well as the oxygen and chlorinated compound levels in the gas, with fewer "soakings" being required at higher levels. Generally, however, at least 3 "soakings" will be required, although redispersion can be effected in from 3 to about 10 "soakings". Preferably, from about 3 to about 7 "soakings" will be used. Following this procedure, the iridium will be redispersed that the resulting catalyst will be reactivated and essentially free of coke.

If the conditions of the primary and secondary burn steps are carefully observed, there will be essentially no iridium agglomeration in burning coke from the catalyst. Occasionally, however, some iridium agglomeration can occur (e.g., when the primary burn temperature exceeds about 425° C., too much moisture enters the system, or insufficient chloride is present on the catalyst to provide the required passivation). But the additional agglomeration that may result can be corrected using the non-flow iridium redispersion procedure described above.

Once iridium redispersion has been effected, excessive chloride may then be removed from the catalyst by contact with steam at temperature ranging from about 400;20 to about 500° C., preferably from about 470° to about 480° C. Preferably, excessive chloride is stripped from the catalyst by use of an admixture of steam and at least one of the chlorinated compounds mentioned above. If hydrogen chloride (the preferred chlorinated compound) is used, the molar ratio of $H_2O$:HCl should range from about 80:1 to about 20:1, more preferably from about 50:1 to about 30:1. The catalyst, after stripping, will contain from about 0.8 to about 1.3 wt% (preferably from about 0.9 to about 1.1 wt%, chloride) based on the weight of the catalyst (dry basis). Then the regenerated catalyst is ready for use to convert hydrocarbon feed.

The metal hydrogenation-dehydrogenation component, or components, of the catalyst can be associated or composited with the porous refractory inorganic oxide by various methods known to the art. Generally, this component is added to the catalyst in a concentration ranging from about 0.01 to about 10 wt%, preferably from about 0.1 to about 2 wt%, based on the weight of the catalyst (dry basis). An especially preferred catalyst is one which contains from about 0.01 to about 2 wt% platinum (preferably from about 0.1 to about 0.6 wt% platinum) and from about 0.1 to about 0.6 wt% iridium (preferably from about 0.1 to about 0.6 wt% iridium) on alumina. When there is more than one component, the several components can be dispersed on the porous inorganic oxide support in intimate admixture with each other by a suitable technique such as ion exchange, coprecipitation, impregnation, or the like. The components need not be incorporated onto the porous inorganic oxide support by the same technique. One component can be composited with the porous inorganic oxide by one method such as, for example, coprecipitation, and the other component associated with the porous inorganic oxide by another technique, i.e., impregnation. Furthermore, the components can be composited with the porous inorganic oxide either sequentially or simultaneously. Generally, it is preferred that the components be associated with the porous inorganic oxide by impregnation, either sequentially or simultaneously.

The metal, or metals, can be added in essentially any soluble form of the respective metal, or metals, together in the same solution or in sequence as e.g., soluble salts, acids or other form of compounds. For example, iridium or platinum, or both, can be incorporated with a porous inorganic support in intimate admixture therewith by any suitable technique such as ion exchange, coprecipitation, impregnation, or the like. The separate metal components need not be incorporated onto the porous inorganic oxide by the same technique. One metal (e.g., iridium) can be associated with the porous inorganic oxide by one method (e.g., coprecipitation) and the other component (e.g., platinum) by another technique (e.g., impregnation) or vice versa. For example, to incorporate platinum onto a porous inorganic oxide support, impregnation with chloroplatinic acid is preferred, but other platinum group compounds (such as ammonium chloroplatinates, polyamine platinum salts, platinum chloride, and the like) can be used. Iridium is suitably incorporated onto a support with periridic acid, ammonium or potassium salts or iridium, and the like. Other metal promoters (e.g., other Group VIII metal components, tin, tungsten, iron, rhenium, lead, germanium, and the like) can also be incorporated onto a porous inorganic oxide with iridium, or iridium and platinum, in a similar manner.

Mildly or moderately acidic refractory oxides may be employed as supports (e.g., silica, silica alumina, alumina, magnesia, thoria, boria, titania, zirconia, various spinels, and the like, with alumina being preferred). High surface area catalysts, or catalysts having surface areas ranging upwardly from about 50 square meters per gram (B.E.T. Method), are preferred. Catalyst having surface areas ranging from about 100 to 250 square meters per gram, and higher, are particularly effective.

In formation of the more active catalysts, refractory inorganic oxides of desired particle size distribution, in dry state, can be contacted, admixed, or otherwise incorporated with metal-containing solution, or solutions, and thereby impregnated. The refractory inorganic oxide can thus be pilled, pelleted, beaded, or extruded, alone or in admixture with other materials, and dried and crushed to form particles of desired size ranging, e.g., from about 0.1 to about 0.4 inch, and preferably from about 0.2 to about 0.3, average diameter. The material can then be treated by contact with a solution containing the desired amount of metal, or metals or treated sequentially by contact with a solution containing one metal and then the other, in the desired amounts. On the other hand, larger particles can be so-treated and then crushed to the desired size. The particulate mass, in either instance, can be dried and calcined, and contacted with hydrogen (generated in situ or ex situ) to reduce the salt. The catalyst composite can also be formed by adding together suitable reagents such as salts of a metal, or metals, and ammonium hydroxide or ammonium carbonate, and a salt of alumina such as aluminum chloride and aluminum sulfate to form aluminum hydroxide. The aluminum hydroxide containing the salts of the metal, or metals, can then be heated, dried, and simultaneously converted to alumina and/or further impregnated with a metal, or metals, if desired. The material can then be calcined and then hydrogentreated, in situ or ex situ, to reduce the salts and complete the formation of the catalyst composite.

Essentially any petroleum or hydrocarbon fraction containing paraffins, naphthenes, and the like, can be reformed and the catalyst regenerated. A suitable feed (e.g., a naphtha, either virgin or cracked, Fischer-Tropsch or mixtures thereof) is contacted at reforming conditions in the presence of hydrogen with a catalyst composite including the support which contains catalytically active amounts of iridium and platinum with other metals. Typical feed stream hydrocarbon molecules are those containing from about 5 to about 12 carbon atoms, or more preferably from about 7 to about 9 carbon atoms. Naphthas, or petroleum fractions boiling within the range of from about 25° to about 190° C. contain hydrocarbons of carbon numbers within these ranges. Typical fractions thus usually contain from about 20 to about 80 volume percent of paraffins, both normal and branched, which fall in the range of about $C_5$ to $C_{12}$, and 5 through about 20 volume percent of the desirable aromatics falling within the range of from about $C_6$ to $C_{12}$.

The non-flow (or stagnant) reactivation procedure of this invention offers significant savings compared to conventional flow procedures by reducing the amount of chlorinated compound required. In addition, no chlorine is injected into the system and corrosion is minimized because an essentially dry gas is preferably used during the catalyst regeneration/reactivation steps. Also, the catalyst need not be reduced.

This invention will be further understood by reference to the following example which is not intended to restrict the scope of the claims appended hereto. In this example, pressures are given in terms of megapascal's (MPa), temperatures in terms of degrees Centigrade, gas flow rates in terms of SCF/hr/lb catalyst, and all parts and percentages are expressed in terms of weight units except as otherwise expressed.

EXAMPLE

Samples of a platinum-iridium catalyst obtained from a commercial refermer after a conventional low temperature or primary burn at 410° C. were reactivated in a pilot plant reactor under flowing and stagnant conditions. The catalyst had 44% iridium agglomeration (as measuredby X-ray diffraction) and 0.15 wt.% coke following the primary burn.

Chlorination

The chloride level on the catalyst was raised from about 1.0 to about 1.8 wt% by contact with a dry nitrogen gas containing about 500 vppm hydrogen chloride for about 6 hours at a temperature of about 480° C. and a pressure of about 1.5 MPa gauge.

Secondary Burn

The chlorinated catalyst was then subjected to a high temperature or secondary burn using dry nitrogen gas containing about 500 vppm hydrogen chloride and about 0.3 wt.% oxygen. The secondary burn lasted about four hours and was performed at the same temperature and pressure used during chlorination.

Iridium Redispersion

Agglomerated iridium was then redispersed using two procedures. In one procedure, a dry nitrogen gas containing hydrogen chloride and oxygen was passed continuously over the catalyst for about 5 hours. In the other procedure, the gas was repeatedly contacted with the catalyst under essentially stagnant gas conditions.

In both methods, the hydrogen chloride level was first increased to 500 vppm and then the oxygen level increased from 0.3 to 2.5 volume percent linearly with time. The operating conditions for both methods are shown below.

|  | Flowing | Stagnant |
| --- | --- | --- |
| Reactor: | | |
| Pressure, MPa | | 1.4 |
| Temperature, °C. | | 500 |
| Gas Composition | | |
| $O_2$, volume % | | Increased linearly with time from 0.3 to 2.5 over 30 minutes |
| HCl, volume ppm | | 500 |
| $N_2$, | | remainder |
| Gas Rate, SCF/hr/lb cat | 70 | Nil |
| Duration, hours | 5 | Once the oxygen and chloride levels at the reactor outlet had stabilized, the catalyst bed was isolated by blocking-off the inlet and outlet to the reactor. The gas was then contacted with the catalyst under stagnant conditions for about 2 hours. The reactor was unblocked and the procedure repeated an additional 3 times |
| Particle Reynolds No. | 250 | 0 |
| Iridium Agglomeration, % (1) | | |
| Initial | | 44 |
| Final | 40 | <5 |
| Coke, wt. % | | <0.1 |

(1) Measured by X-ray diffraction.

The data in this example show that "soaking" the catalyst with the regeneration gas under stagnant conditions effectively redisperses the iridium whereas very little redispersion is obtained under turbulent flow conditions (i.e., when the particle Reynolds Number is at least 200).

What is claimed is:

1. In a process for the catalytic conversion of hydrocarbons wherein a hydrocarbon feedstock is contacted with a catalyst containing an iridium component composited with a porous refractory inorganic oxide support at hydrocarbon conversion conditions, the catalyst having been at least partially deactivated during contact with the feedstock by coke deposition thereon, the catalyst having been regenerated after discontinuing contact of said catalyst with the feedstock in a series of steps which include
   (i) providing a bed of the catalyst in a reaction zone wherein the catalyst has a chloride level of at least about 0.9 wt.%.
   (ii) burning a major portion of the coke from the catalyst while adding a gas containing a chlorinated compound in an amount sufficient to maintain at least 0.9 wt.% chloride on the catalyst and oxygen in a concentration ranging up to about 5000 vppm to provide a flame front temperature not exceeding about 425° C.,
   (iii) increasing the chloride level of the catalyst to at least about 1.6 wt.%,
   (iv) burning a major portion of the remaining coke from the catalyst while adding a gas containing from about 100 to about 5000 vppm of a chlorinated compound and up to about 5000 vppm oxygen to provide a flame front temperature of at least about 460° C.,
   the improvement comprising
   (a) contacting the substantially coke-depleted catalyst with a gas containing from about 300 to about 10,000 vppm of a chlorinated compound and from about 0.3 to about 5 vol.% of oxygen at a temperature of at least about 460° C. under essentially stagnant gas conditions for at least about 1 hour, the concentrations of the chlorinated compound and oxygen during this contacting being greater than the concentrations used in (iv), and
   (b) repeating (a) at least two additional times to redisperse the agglomerated iridium, thereby obtaining a substantially coke-depleted and reactivated iridium-containing catalyst.

2. The process of claim 1 wherein the chlorinated compound is carbon tetrachloride, hydrogen chloride, trichloroethylene, or mixtures thereof.

3. The process of claim 2 wherein the chlorinated compound comprises hydrogen chloride.

4. The process of claim 1 wherein the bed of catalyst in (i) has a chloride level ranging from about 0.9 to about 1.5 wt.%.

5. The process of claim 4 wherein the bed of catalyst in (ii) is contacted with a gas containing a chlorinated compound in an amount sufficient to maintain the catalyst chloride level between about 0.9 and about 1.5 wt.% and oxygen in a concentration ranging from about 1000 to about 5000 vppm.

6. The process of claim 5 wherein the chloride level of the bed of catalyst in (iii) is increased to between about 1.6 and 2.5 wt.%.

7. The process of claim 6 wherein the oxygen concentration of the gas in (iv) ranges from about 100 to about 5000 vppm.

8. The process of claim 1 wherein the gas in (a) contains from about 500 to about 5000 vppm of the chlorinated compound and from about 0.3 to about 3 vol.% oxygen.

9. The process of claim 1 wherein the catalyst from (b) is stripped with steam to obtain a catalyst having a chloride content between about 0.8 and about 1.3 wt.%.

10. The process of claim 1 wherein the concentration of oxygen in the gas in (a) is linearly increased to a level between 0.3 and about 5 vol.%.

11. In a process for the catalytic reforming of a naphtha feedstock wherein the feedstock is contacted at reforming conditions with a reforming catalyst containing a iridium component composited with an alumina support, the catalyst having been at least partially deactivated during contact with the naphtha by the deposition of coke thereon, the catalyst having been regenerated after discontinuing contact of the catalyst with the naphtha in a series of steps which include
   (i) providing a bed of the catalyst in a reaction zone wherein the catalyst has a chloride level between about 0.9 and about 1.5 wt.%, (ii) burning a major portion of the coke from the catalyst while adding a gas containing hydrogen chloride in an amount sufficient to maintain the chloride level on the catalyst between about 0.9 and about 1.5 wt.% and oxygen in a concentration ranging up to about 5000 vppm to provide a flame front temperature not exceeding about 425° C., (iii) increasing the chloride level of the catalyst to at least about 1.6 wt.%, (iv) burning a major portion of the remaining coke from the catalyst while adding a gas containing from about 100 to about 5000 vppm of a chlorinated compound and up to about 5000 vppm oxygen to provide a flame front temperature of at least about 460° C., the improvement comprising (a) contacting the substantially coke-depleted catalyst with a gas containing from about 300 to about 10,000 vppm of a chlorinated compound and from about 0.3 to about 5 vol.% of oxygen at temperature of at least about 460° C. under essentially stagnant gas conditions for from about 1 to about 6 hours, the concentrations of the chlorinated compound and oxygen during this contacting being greater than the concentrations used in (iv), and (b) repeating (a) at least two additional times to redisperse the agglomerated iridium, thereby obtaining a substantially coke-depleted and reactivated iridium-containing catalyst.

12. The process of claim 11 wherein the chlorinated compound is carbon tetrachloride, hydrogen chloride, trichloroethylene, or mixtures thereof.

13. The process of claim 12 wherein the chlorinated compound comprises hydrogen chloride.

14. The process of claim 11 wherein the bed of catalyst in (i) has a chloride level ranging from about 1.0 to about 1.2 wt.%.

15. The process of claim 14 wherein the catalyst in (ii) is contacted with a gas containing a chlorinated compound in an amount sufficient to maintain the catalyst chloride level between about 1.0 and about 1.2 wt.% and oxygen in a concentration ranging from about 1000 to about 5000 vppm.

16. The process of claim 15 wherein the chloride level of the bed of catalyst in (iii) is increased to between about 1.6 and about ;b 2.5 wt.%.

17. The process of claim 16 wherein the oxygen concentration of the gas in (iv) ranges from about 2000 to about 4000 vppm.

18. The process of claim 11 wherein the gas in (a) contains from about 500 to about 5000 vppm of the chlorinated compound and from about 0.3 to about 3 vol.% oxygen.

19. The process of claim 11 wherein the catalyst from (b) is stripped with steam to obtain a catalyst having a chloride content between about 0.8 and about 1.3 wt.%.

20. The process of claim 11 wherein the concentration of oxygen in the gas in (a) is linearly increased to a level between about 0.3 and about 5 vol.%.

21. In a process for the catalytic reforming of a naphtha feedstock wherein a naphtha feedstock is contacted at reforming conditions with a platinum reforming catalyst containing an additional iridium component composited with an alumina support, the catalyst having been at least partially deactivated during reforming by reforming by contact with said naphtha by the deposition of coke thereupon, said catalyst having been regenerated after discontinuing contact of said catalyst with said naphtha in a series of steps which include (i) providing a bed of the catalyst in a reaction zone wherein the catalyst has a chloride level between about 0.9 and about 1.5 wt.%, (ii) burning a major portion of the coke from the catalyst while adding a gas containing hydrogen chloride in an amount sufficient to maintain the chloride level of the catalyst between about 0.9 and about 1.5 wt.% and oxygen in concentration ranging up to about 5000 vppm to provide a flame front temperature not exceeding about 425° C., (iii) increasing the chloride level of the catalyst to at least about 1.6 wt.%, (iv) burning a major portion of the remaining coke from the catalyst while adding a gas containing from about 100 to about 5000 vppm of a hydrogen chloride and up to about 5000 vppm oxygen to provide a flame front temperature of at least about 460° C., the improvement comprising (a) contacting the substantially coke-depleted catalyst with a gas containing from about 300 to about 10,000 vppm of hydrogen chloride and from about 0.3 to about 5 vol.% of oxygen at temperature of at least about 460° C. under essentially stagnant gas conditions for from about 1 to about 6 hours, the concentrations of the hydrogen chloride and oxygen during this contacting being greater than the concentrations used in (iv), and (b) repeating (a) at least two additional times to redisperse the agglomerated iridium, thereby obtaining a substantially coke-depleted and reactivated iridium-containing catalyst.

22. The process of claim 21 wherein the bed of catalyst in (i) has a chloride level ranging from about 1.0 to about 1.2 wt.%.

23. The process of claim 22 wherein the catalyst in (ii) is contacted with a gas containing hydrogen chloride in an amount sufficient to maintain the catalyst chloride level between about 1.0 and about 1.2 wt.% and oxygen in a concentration ranging from about 1000 to about 5000 vppm.

24. The process of claim 23 wherein the chloride level of the bed of catalyst in (iii) is increased to between about 1.6 and about 2.5 wt.%.

25. The process of claim 24 wherein the oxygen concentration of the gas in (iv) ranges from about 2000 to about 4000 vppm.

26. The process of claim 21 wherein the gas in (a) contains from about 500 to about 5000 vppm of the hydrogen chloride and from about 0.3 to about 3 vol.%.

27. The process of claim 21 wherein the catalyst from (b) is stripped with steam to obtain a catalyst having a chloride content between about 0.8 and about 1.3 wt.%.

28. The process of claim 27 wherein the catalyst from (b) is stripped with steam and hydrogen chloride.

29. The process of claim 28 wherein the molar ratio of steam to hydrogen chloride ranges from about 8.01 to about 20:1.

30. The process of claim 21 wherein the concentration of oxygen in the gas in (a) is linearly increased to a level between 0.3 and about 5 vol.%.

31. The process of claim 30 wherein (a) is repeated from about 2 to about 6 times.

32. The process of claim 30 wherein the temperature in (iv) and (a) ranges from about 480° C. to about 510° C.

* * * * *